(12) United States Patent
Lin

(10) Patent No.: US 11,207,917 B1
(45) Date of Patent: Dec. 28, 2021

(54) WHEEL ASSEMBLY

(71) Applicant: CATIS PACIFIC MFG. CORP. LTD., Douliou (TW)

(72) Inventor: Ching-Sung Lin, Douliou (TW)

(73) Assignee: CATIS PACIFIC MFG. CORP. LTD., Douliou (TW)

( * ) Notice: Subject to any disclaimer, the term of this patent is extended or adjusted under 35 U.S.C. 154(b) by 0 days.

(21) Appl. No.: 17/168,477

(22) Filed: Feb. 5, 2021

(51) Int. Cl.
  *B60B 33/02* (2006.01)
  *B60B 33/00* (2006.01)
  *B62B 5/04* (2006.01)

(52) U.S. Cl.
  CPC ........ *B60B 33/021* (2013.01); *B60B 33/0039* (2013.01); *B60B 33/0049* (2013.01); *B60B 33/0057* (2013.01); *B60B 33/0068* (2013.01); *B60B 33/0081* (2013.01); *B60B 33/025* (2013.01); *B60B 2200/43* (2013.01); *B60B 2900/113* (2013.01); *B60B 2900/531* (2013.01); *B60B 2900/541* (2013.01); *B62B 5/0485* (2013.01)

(58) Field of Classification Search
  CPC . B60B 33/0078; B60B 33/0086; B60B 33/02; B60B 33/025; B60B 33/021; B60B 33/0081; B60B 33/04
  See application file for complete search history.

(56) References Cited

U.S. PATENT DOCUMENTS

| | | | | |
|---|---|---|---|---|
| 4,414,702 A * | 11/1983 | Neumann | ............. | B62B 5/0485 16/35 R |
| 4,658,466 A * | 4/1987 | Vollberg | ............. | B60B 33/0078 16/19 |
| 4,677,706 A * | 7/1987 | Screen | ................ | B60B 33/0042 16/35 R |
| 4,815,161 A * | 3/1989 | Timmer | ................ | B60B 33/021 16/35 R |
| 5,014,391 A * | 5/1991 | Schulte | ............... | B60B 33/0042 16/35 R |
| 5,139,116 A * | 8/1992 | Screen | ................ | B60B 33/0042 16/35 R |
| 5,184,373 A * | 2/1993 | Lange | ..................... | B60B 33/00 16/35 R |
| 5,303,450 A * | 4/1994 | Lange | ................... | B60B 33/021 16/35 D |
| 5,503,416 A * | 4/1996 | Aoki | ..................... | A61B 6/4405 16/35 R |
| 5,774,936 A * | 7/1998 | Vetter | ................... | B60B 33/021 16/35 R |
| 6,834,746 B1 * | 12/2004 | Lin | ..................... | B60B 33/0018 16/35 R |

(Continued)

*Primary Examiner* — Jeffrey O'Brien
(74) *Attorney, Agent, or Firm* — Muncy, Geissler, Olds & Lowe, P.C.

(57) ABSTRACT

A wheel assembly includes: a wheel set unit including a wheel bracket and a wheel; and a brake unit including a brake element disposed between the wheel bracket and the wheel, a threaded member sleeved movably on the brake element, and a screw extending threadably through the threaded member, extending through the brake element so as to prevent movement of the threaded member on the brake element, and pushable downwardly such that the brake unit moves downwardly to press resiliently against the wheel, so as to arrest rotation of the wheel. Only a single tool is needed to be accessed to a lower end of the screw so as to adjust a distance between the brake unit and the wheel.

11 Claims, 10 Drawing Sheets

(56) References Cited

U.S. PATENT DOCUMENTS

| | | | | |
|---|---|---|---|---|
| 7,134,167 B2 * | 11/2006 | Yan | B60B 33/0021 | 16/39 |
| 7,406,745 B2 * | 8/2008 | Chou | B60B 33/0021 | 16/35 R |
| 7,810,613 B2 * | 10/2010 | Lin | B60B 33/025 | 188/1.12 |
| 7,987,553 B2 * | 8/2011 | Lin | B60B 33/0049 | 16/35 R |
| 7,992,254 B2 * | 8/2011 | Ahn | B60B 33/0068 | 16/35 R |
| 8,079,606 B2 * | 12/2011 | Dull | B60B 33/0021 | 280/47.39 |
| 8,365,354 B1 * | 2/2013 | Fan | B60B 33/04 | 16/35 R |
| 8,452,508 B2 * | 5/2013 | Frolik | B60B 33/0039 | 701/70 |
| 8,516,656 B2 * | 8/2013 | Lin | B60B 33/0081 | 16/35 R |
| 8,789,662 B2 * | 7/2014 | Childs | A61G 1/0243 | 188/1.12 |
| 8,850,657 B1 * | 10/2014 | Yang | B60B 33/021 | 16/35 R |
| 9,038,786 B2 * | 5/2015 | Lin | B60B 33/0042 | 188/1.12 |
| 9,139,043 B1 * | 9/2015 | Fan | B60B 33/0047 | |
| 9,908,367 B2 * | 3/2018 | Yamamoto | B60B 33/0086 | |
| 10,486,466 B1 * | 11/2019 | Yang | B60B 33/0057 | |
| 10,857,833 B2 * | 12/2020 | Patmore | B60B 33/0039 | |
| 11,065,913 B2 * | 7/2021 | Molozis | B60B 33/025 | |
| 2006/0254867 A1 * | 11/2006 | Yan | B60B 33/0086 | 188/73.1 |
| 2011/0067202 A1 * | 3/2011 | Chou | B60B 33/0068 | 16/45 |
| 2012/0255141 A1 * | 10/2012 | Lin | B60B 33/0081 | 16/45 |
| 2015/0258850 A1 * | 9/2015 | Schioppa | B60B 33/0042 | 16/35 R |
| 2021/0276366 A1 * | 9/2021 | Hartkopf | B60B 33/0049 | |

* cited by examiner

WHEEL ASSEMBLY

FIELD

The disclosure relates to a wheel assembly, more particularly to a wheel assembly for a trolley.

BACKGROUND

Referring to FIGS. 1 and 2, a conventional wheel assembly includes a wheel seat 91, a wheel 92 pivotally mounted to the wheel seat 91, a central shaft 93 rotatable about its axis and mounted on the wheel seat 91, a toothed plate 94 sleeved on the central shaft 93 at a lower end of the central shaft 93 and co-axially with the central shaft 93, and a fastening device 95 for fastening the tooth plate 94 to a lower end of the central shaft 93. The conventional wheel assembly further includes a liner 97, a positioning pad 98, and a brake pad 99 that are sequentially positioned under the wheel seat 91 by a plurality of rivets 96. The positioning pad 98 is formed with a plurality of slots 980. The brake pad 99 includes two leg portions 991 extending transverse to a rotating axis of the wheel 92. The fastening device 95 includes a nut 952 disposed under the central shaft 93 and a bolt 951 extending threadedly through the nut 952 and into the central shaft 93.

The central shaft 93 can be operated to move the detent device 95 downwardly and to move the toothed plate 94 downwardly so that selected ones of downwardly extending teeth of the toothed plate 94 engage the slots 980, respectively, to arrest pivotal movement of the wheel 92. The leg portions 991 of the brake pad 99 are pushed downwardly by the detent device 95 to press against an outer peripheral surface of the wheel 92 so as to arrest rotation of the wheel 92 and to achieve the effect of braking.

By rotating the bolt 951 and the nut 952, a distance between the bolt 951 and the brake pad 99 can be adjusted so as to achieve the purpose of adjusting a brake stroke. However, since it is required to rotate the bolt 951 relative to the nut 952, two wrenches are needed to adjust the distance between the bolt 951 and the brake pad 99. Consequently, it is relatively troublesome to adjust the brake stroke of the conventional wheel assembly.

Additionally, the bolt 951 and the nut 952 may be loosened and fall off from the wheel seat 91 after a period time of use. Further, it is time consuming to sequentially assemble the liner 97, the positioning pad 98 and the brake pad 99 on the wheel seat 91.

SUMMARY

Therefore, an object of the disclosure is to provide a wheel assembly capable of alleviating the drawbacks of the conventional wheel assembly.

According to an aspect of the disclosure, a wheel assembly includes a transmission unit, a wheel set unit, and a brake unit. The transmission unit includes a shaft seat and a transmission shaft. The transmission shaft extends through the shaft seat along an up-down direction and is operable to move relative to the shaft seat along the up-down direction. The wheel set unit includes a wheel bracket mounted at a bottom end of the shaft seat and rotatable about the transmission shaft, and a wheel mounted pivotally to the wheel bracket. The brake unit includes a brake element, an internally threaded member, and a screw. The brake element has a fixed end mounted fixedly to the wheel bracket. The internally threaded member is spaced apart from the fixed end and is sleeved movably on the brake element. The screw extends threadably through the internally threaded member and extends vertically and movably through the brake element such that movement of the internally threaded member relative to the brake element is prevented. The screw is pushable downwardly by the transmission shaft such that the brake unit moves downwardly to press resiliently against the wheel, so as to arrest rotation of the wheel. The screw is configured such that a single tool is allowed to be accessed to a lower end of the screw so as to adjust a distance between the brake unit and the wheel.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
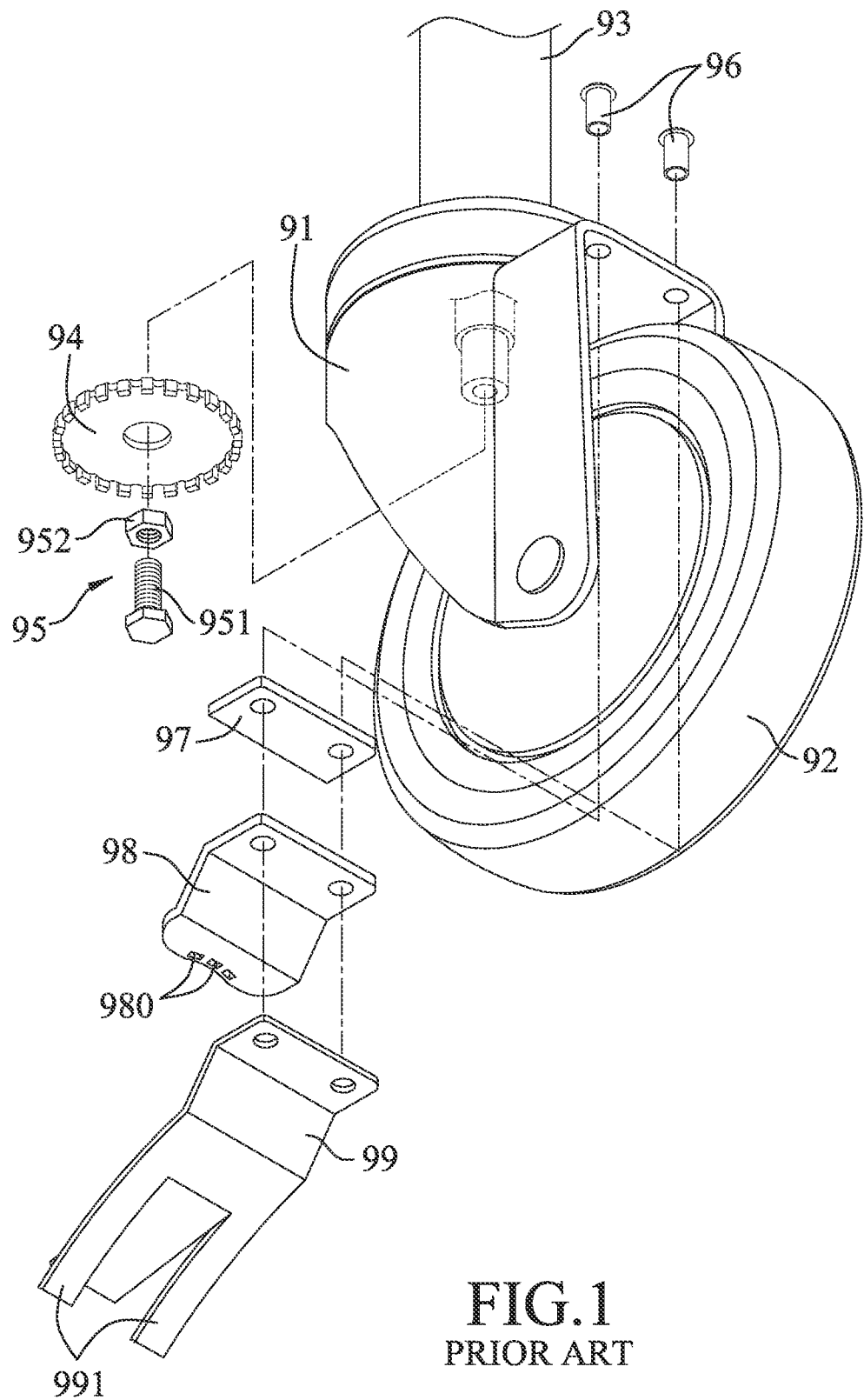
FIG. 1 is a schematic exploded perspective view of a conventional wheel assembly.
Figure 2:
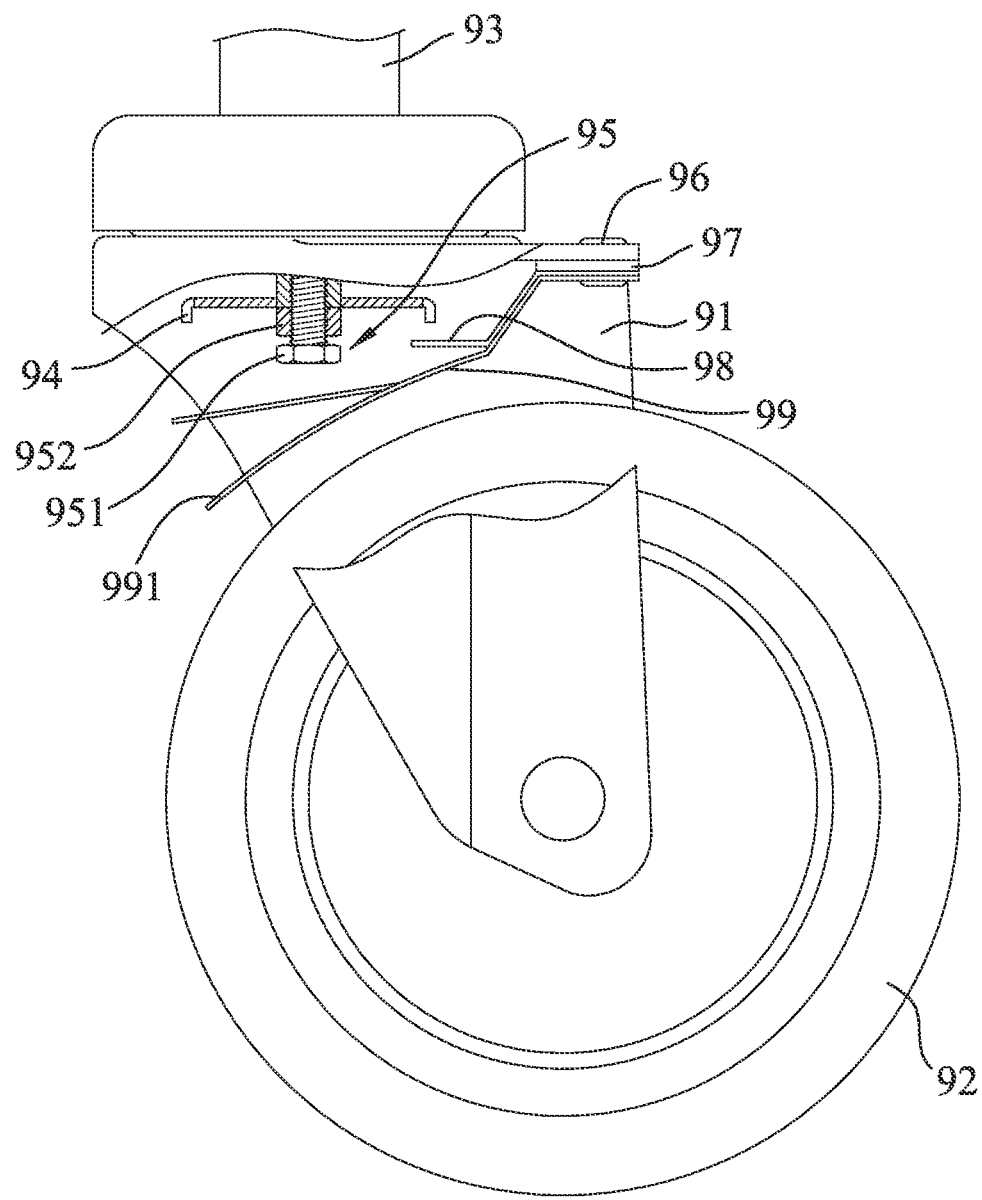
FIG. 2 is a schematic partly sectional view of the conventional wheel assembly.

Before the present invention is described in greater detail, it should be noted that where considered appropriate, reference numerals or terminal portions of reference numerals have been repeated among the figures to indicate corresponding or analogous elements, which may optionally have similar characteristics.

Figure 3:
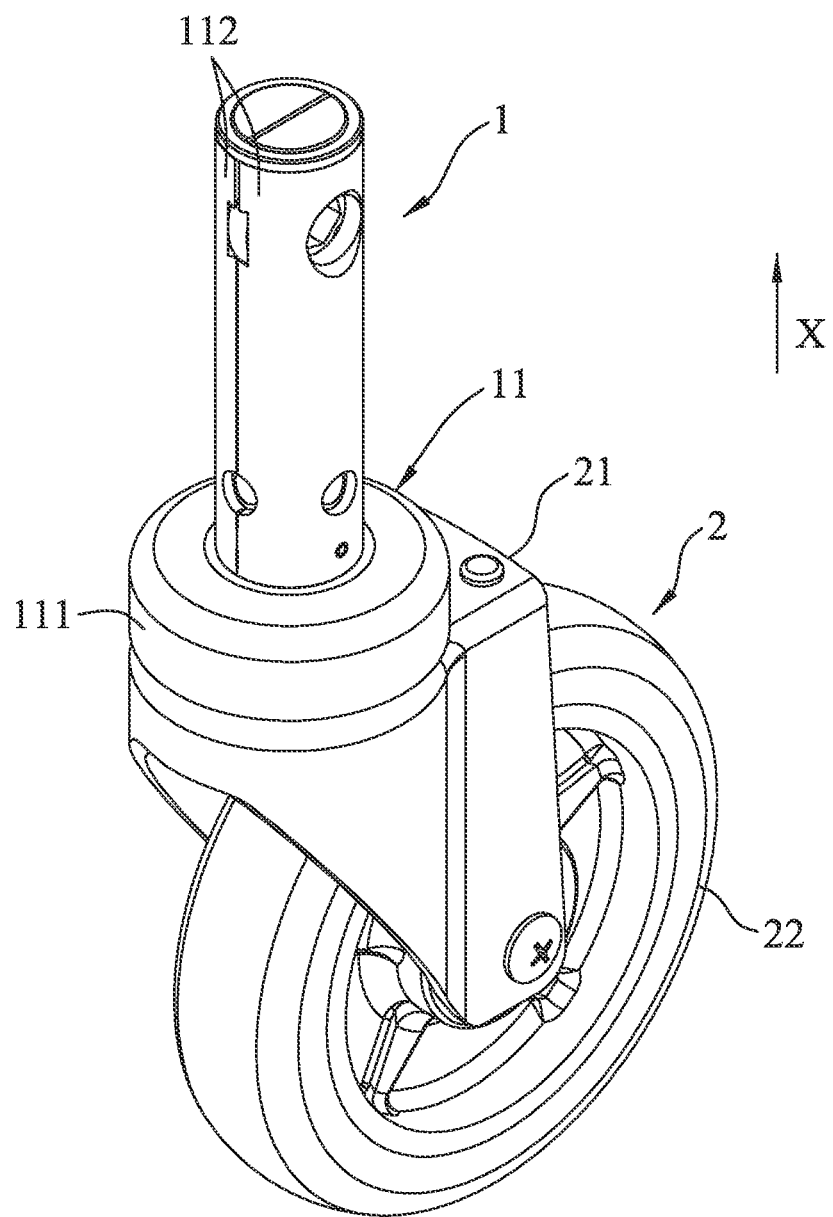
FIG. 3 is a perspective view of a wheel assembly according to according to a first embodiment of the present disclosure.
Figure 4:
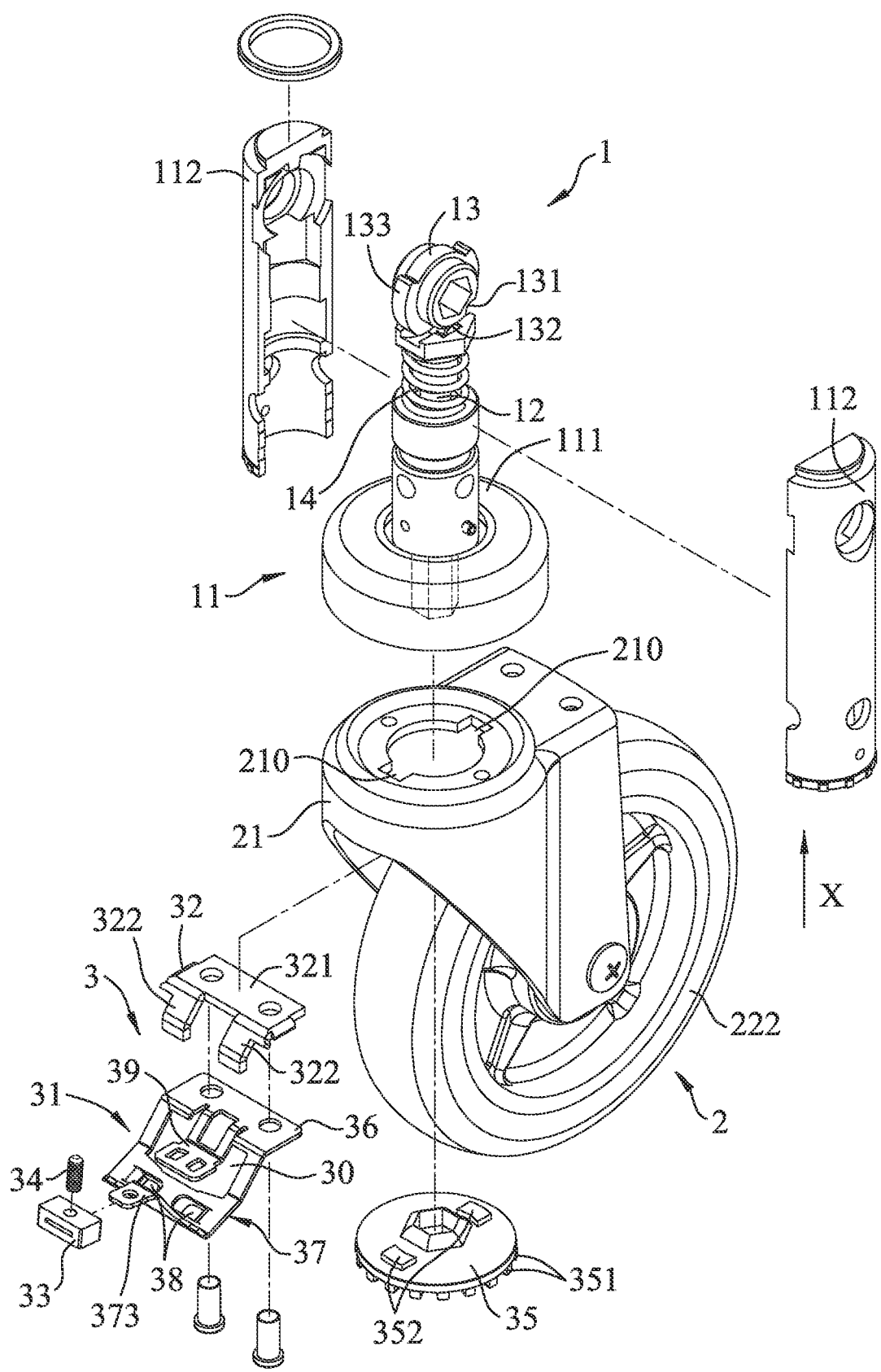
FIG. 4 is a partly exploded perspective view of the wheel assembly of the first embodiment.
Figure 5:
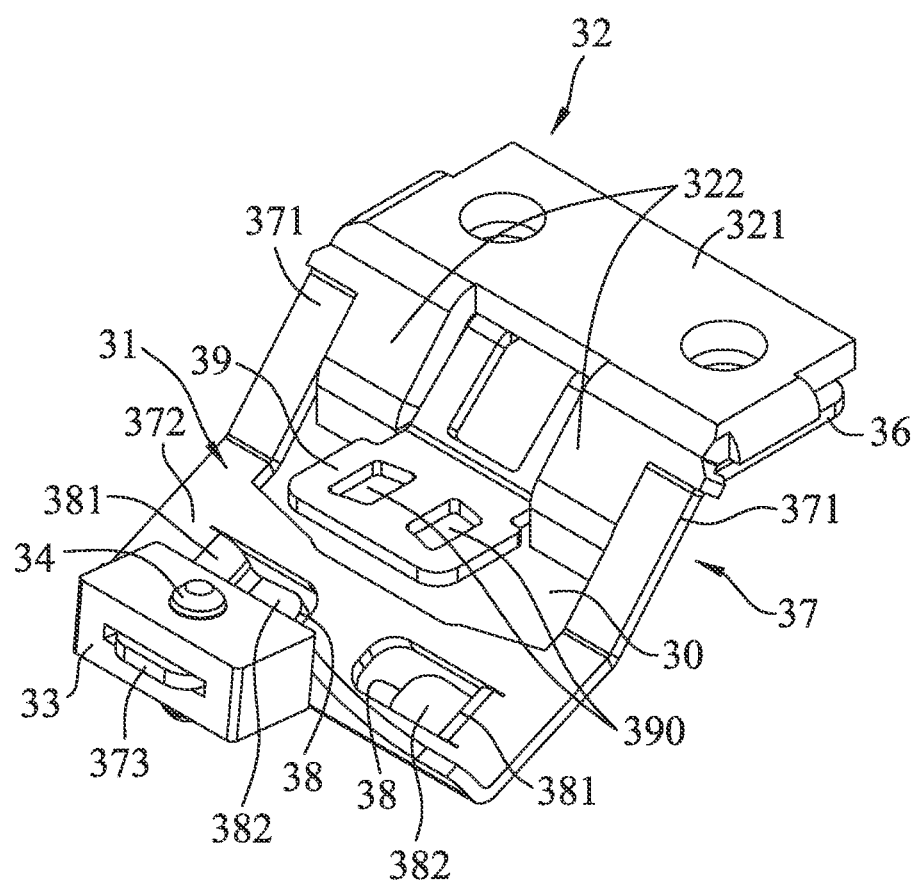
FIG. 5 is a perspective view of a portion of a brake unit of the wheel assembly of the first embodiment.

Referring to FIGS. 3 to 5, a first embodiment of a wheel assembly according to the present disclosure is shown. The wheel assembly is, for example but not limited to, a wheel assembly to be used in a trolley (not shown) and is mounted under a platform of the trolley. The wheel assembly includes a transmission unit 1, a wheel set unit 2, and a brake unit 3. The transmission unit 1 includes a shaft seat 11, a transmission shaft 12, a cam element 13 and a biasing member 14. The shaft seat 11 includes a seat body 111 and two shaft halves 112 mounted on the seat body 111, extending along an up-down direction (X), and cooperating with each other to define a channel 120 (see FIG. 6) therebetween. The transmission shaft 12 extends through the channel 120 between the shaft halves 112 and into the seat body 111 along the up-down direction (X), and is operable to move relative to the shaft seat 11 along the up-down direction (X).

Figure 6:
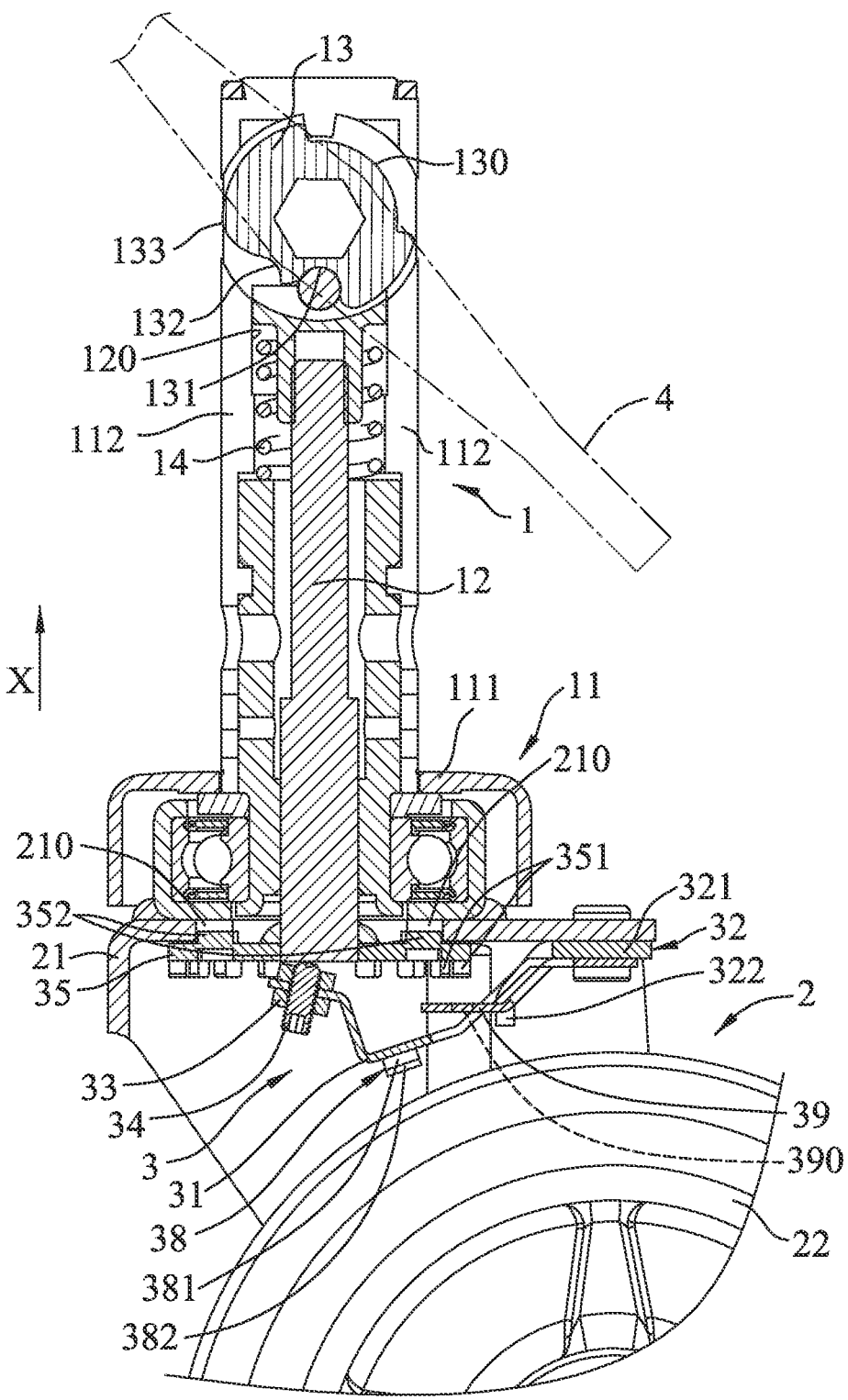
FIG. 6 is a fragmentary schematic sectional view of the first embodiment, illustrating rotation of a wheel relative to a transmission shaft being prevented while rotation of the wheel about its axis is allowed.

Further referring to FIG. 6, the cam element 13 is rotatable about a transverse axis transverse to the transmission shaft 12 and has an outer peripheral surface 130 abutting against a top end of the transmission shaft 12. The outer peripheral surface 130 has a protruding surface section 133, a first concaved surface section 131 concaved radially and inwardly, and a second concaved surface section 132 concaved radially and inwardly and having a depth smaller than that of the first concaved surface section 132 in a radial direction. The cam element 13 is operable to rotate about the transverse axis to allow a selected one of the first concaved surface section 131, the second concaved surface section 132 and the protruding surface section 133 to contact the transmission shaft 12. The biasing member 14 is mounted between the transmission shaft 12 and the shaft bracket 11, and biases the transmission shaft upwardly along the up-down direction (X) to contact the cam element 13.

The wheel set unit 2 includes a wheel bracket 21 mounted at a bottom end of the shaft seat 11 and rotatable about the transmission shaft 12, and a wheel 22 mounted pivotally to the wheel bracket 21. The wheel bracket 21 has an inner periphery that is formed with two positioning notches 210.

The brake unit 3 includes a brake element 31, a limiting member 32, an internally threaded member 33, a screw 34, and a toothed disc 35. The brake element 31 has a fixed end 36 mounted fixedly to the wheel bracket 21, a main body 37 extending from and disposed below the fixed end 36, two protrusions 38 extending from and disposed below the main body 37, and a locking portion 39 connected to the fixed end 36.

The main body 37 includes two inclined interconnecting segments 371 extending downwardly and outwardly from the fixed end 36 and flanking the locking portion 39, an inclined stamped segment 372 extending outwardly and downwardly from lower ends of the interconnecting segments 371, and an insert segment 373 extending upwardly and outwardly from a lower end of the stamped segment 372. The internally threaded member 33 is spaced apart from the fixed end 36 and is sleeved movably on the insert segment 373. The screw 34 extends threadably through the internally threaded member 33 and extends vertically and movably through the insert segment 373 such that movement of the internally threaded member 33 relative to the brake element 31 is prevented. The fixed end 36, the interconnecting segments 371 and the stamped segment 372 cooperate with one another to define an opening 30 thereamong. The protrusions 38 are co-movable downwardly with the main body 37 to press against an outer peripheral surface of the wheel 22 to arrest rotation of the wheel 22. Specifically, each of the protrusions 38 is configured as a pressed protruding tab formed by stamping and includes an extending segment 381 extending downwardly from the stamped segment 372, and a brake segment 382 extending transversely along a direction parallel to a rotating axis of the wheel 22 from the extending segment 381 toward the other one of the protrusions 38. Note that in other embodiments of the present disclosure, the brake segments 382 of the protrusions 38 may extend away from each other along the direction parallel to the rotating axis of the wheel 22 or extend along a direction transverse to the rotating axis of the wheel 22 and the present disclosure is not limited in this respect. The locking portion 39 extends from the fixed end 36 into the opening 30, is disposed between and spaced apart from the interconnecting segments 371, and is formed with two holes 390.

The limiting member 32 is mounted to the wheel bracket 21 and includes a mounting portion 321 that is mounted fixedly between the fixed end 36 and the wheel bracket 21, and two leg portions 322 that are spaced apart from each other, that extend from and disposed below the mounting portion 321, that extend into the opening 30, and that abut respectively against two sides of the locking portion 39 which are opposite along a direction parallel to the rotating axis of the wheel 22.

The screw 34 is pushable downwardly by the transmission shaft 12 such that the brake unit 3 moves downwardly to press resiliently against the wheel 22, so as to arrest rotation of the wheel 22.

The toothed disc 35 is mounted to a bottom end portion of the transmission shaft 12, and is disposed under the shaft seat 11 and between the wheel bracket 21 and the locking portion 39 of the brake element 31. The toothed disc 35 has an upper surface formed with two positioning protrusions 352 extending upwardly and includes a plurality of downwardly extending teeth 351 angularly spaced apart from one another and arranged around the transmission shaft 12. The toothed disc 35 is co-movable downwardly with the transmission shaft 12 to contact the locking portion 39, such that two of the teeth 351 engage the holes 390, respectively, to arrest pivotal movement of the wheel 22 about a central axis of the transmission shaft 12. Note that the number of the holes 390 formed in the locking portion 39 is not limited to two and may be one or more than three in other embodiments of this disclosure.

In this embodiment, the internally threaded member 33 is made of plastic, preferably a high structural strength engineering plastic, e.g., but not limited to, polyamide (PA), acrylonitrile-Butadiene-Styrene (ABS), polycarbonate (PC) and polyoxymethylene (POM). The screw 34 is, for example, but not limited to, a self-tapping screw. Thus, connection strength among the screw 34, the internally threaded member 33 and the brake element 31 is ensured.

To use the wheel assembly of the present disclosure, the wheel assembly is mounted on a vehicle such as a trolley, a cart or a tool cart, and an operating rod 4 (see FIG. 6) is mounted to the cam element 13 and is pivotable about the transverse axis to rotate the cam element 13 about the transverse axis.

As shown in FIG. 6, the operating rod 4 is operated to rotate the cam element 13 to allow the first concaved surface section 131 contacts the transmission shaft 12, such that the positioning protrusions 352 of the toothed disc 35 are biased by the biasing member 14 into the positioning notches 210, respectively, so as to prevent pivotal movement of the wheel 22 about the central axis of the transmission shaft 12, while allowing rotation of the wheel 22 about the rotating axis of the wheel 22.

Figure 7:
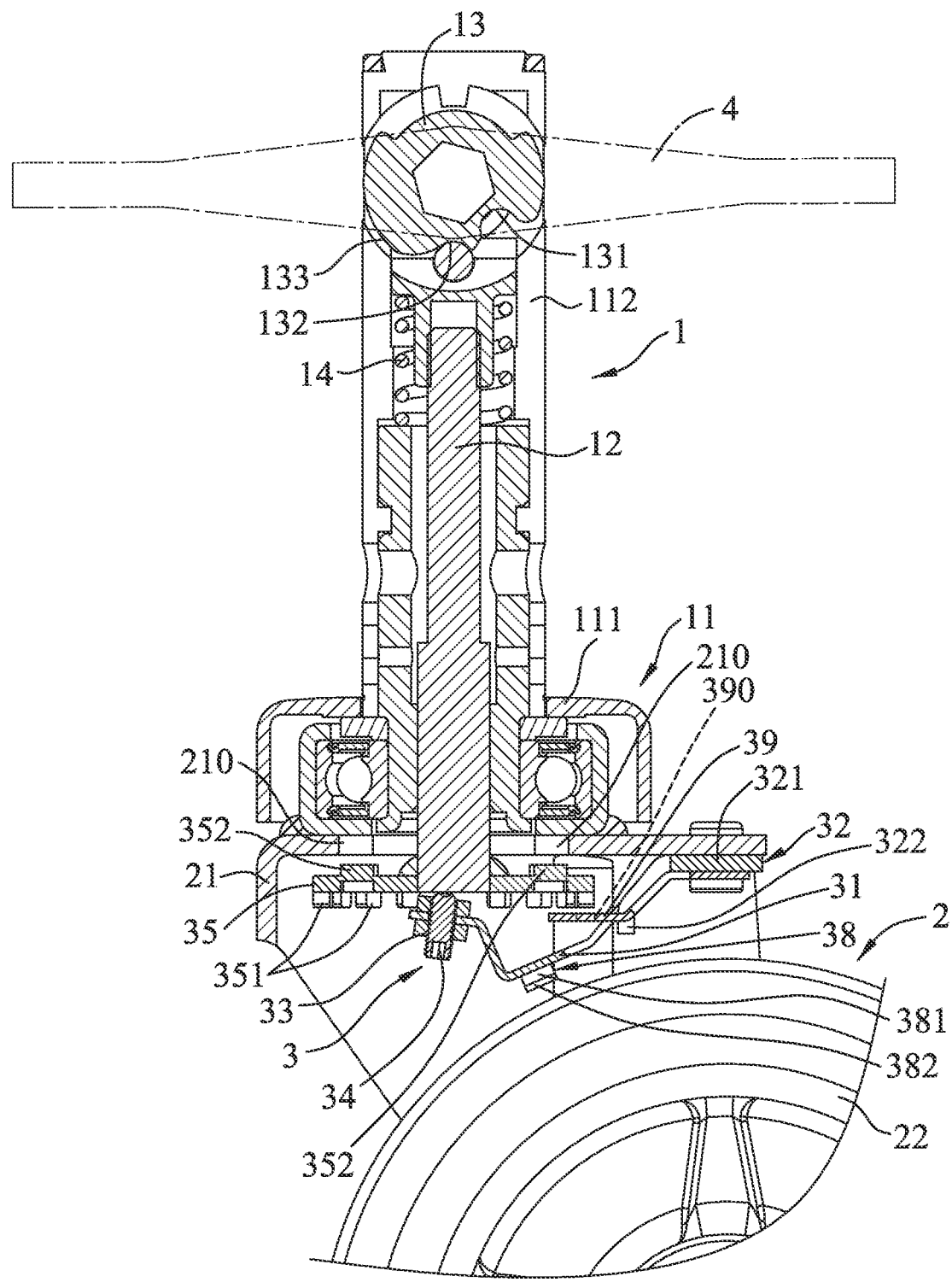
FIG. 7 is similar to FIG. 6, but illustrating rotation of the wheel about either of its axis and the transmission shaft being allowed.

Further referring to FIG. 7, when the operating rod 4 is operated to rotate the cam element 13 to allow the second concaved surface section 132 contacts the transmission shaft 12, the toothed disc 35 moves downwardly and the positioning protrusions 352 respectively disengage the positioning notches 210, so that rotation of the wheel 22 about either of the central axis of the transmission shaft 12 and the rotating axis of the wheel 22 is allowed.

Figure 8:
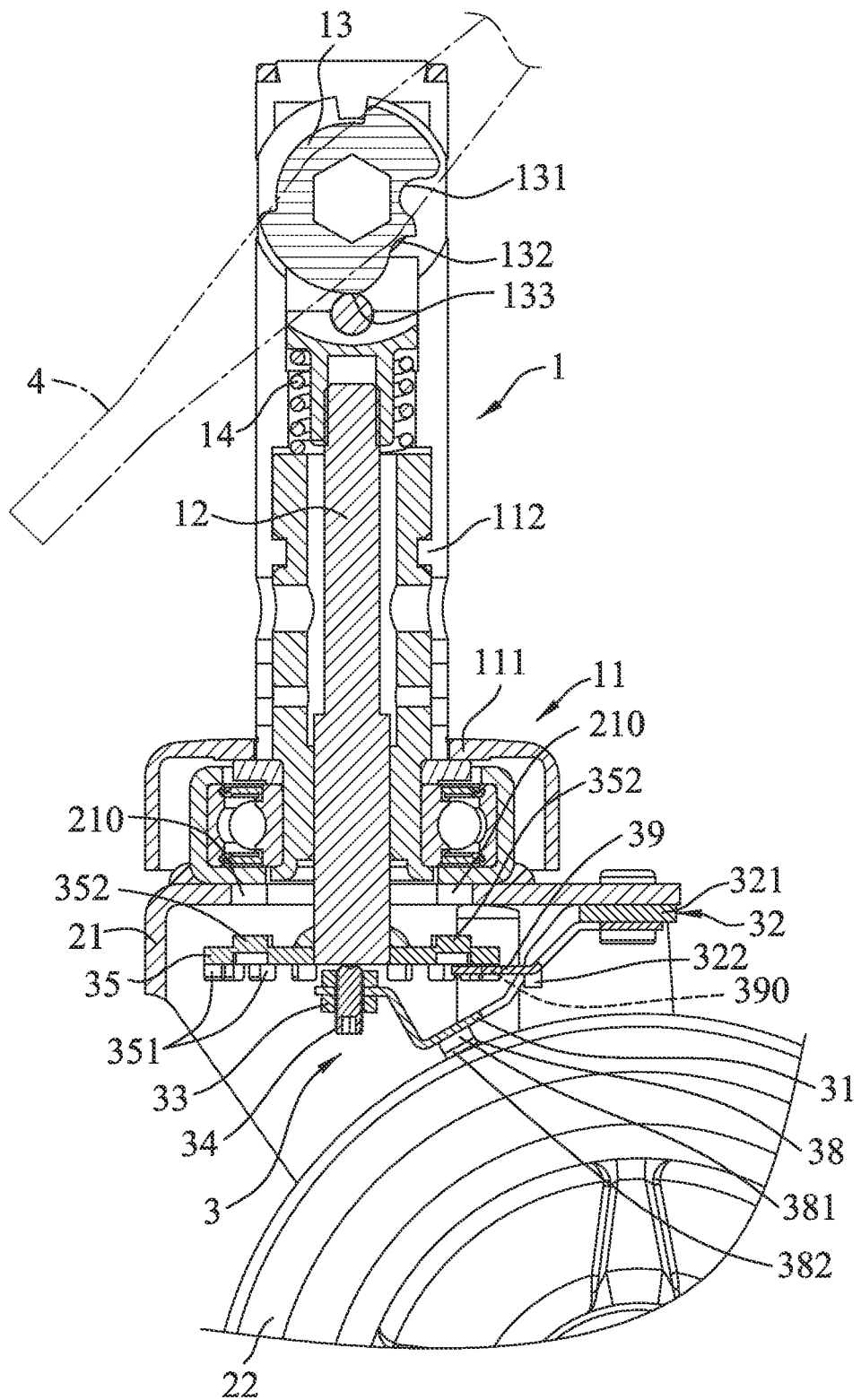
FIG. 8 is similar to FIG. 7, but illustrating rotation of the wheel about either of its axis and the transmission shaft being prevented.

Further referring to FIG. 8, when it is required to prevent rotation of the wheel 22 about either of the central axis of the transmission shaft 12 and the rotating axis of the wheel 22, the operating rod 4 is operated to rotate the cam element 13 to allow the protruding surface section 133 contacts the transmission shaft 12. When the protruding surface section 133 comes into contact with the transmission shaft 12, the transmission shaft 12 is pushed by the cam element 13 to move downwardly relative to the shaft seat 11 and compresses the biasing member 14. At this time, the transmission shaft 12 pushes the screw 34 downwardly to move the brake segment 382 of the brake element 31 downwardly in such a manner that the brake segment 382 of each of the protrusions 38 is co-movable with the main body 37 to press resiliently against the outer peripheral surface of the wheel 22 to thereby achieve the effect of arresting rotation of the wheel 22. At the same time, the transmission shaft 12 is pushed by the cam element 13 to move downwardly to move the toothed disc 35 downwardly so that two of the teeth 351 engage respectively the holes 390 to arrest pivotal movement of the wheel 22 relative to the central axis of the transmission shaft 12. Note that abutment of the leg portions 322 against two sides of the locking portion 39 results in an increase in the structural strength of the locking portion 39 so as to prevent the locking portion 39 from bending by lateral stress exerted by the toothed disc 35.

Figure 9:
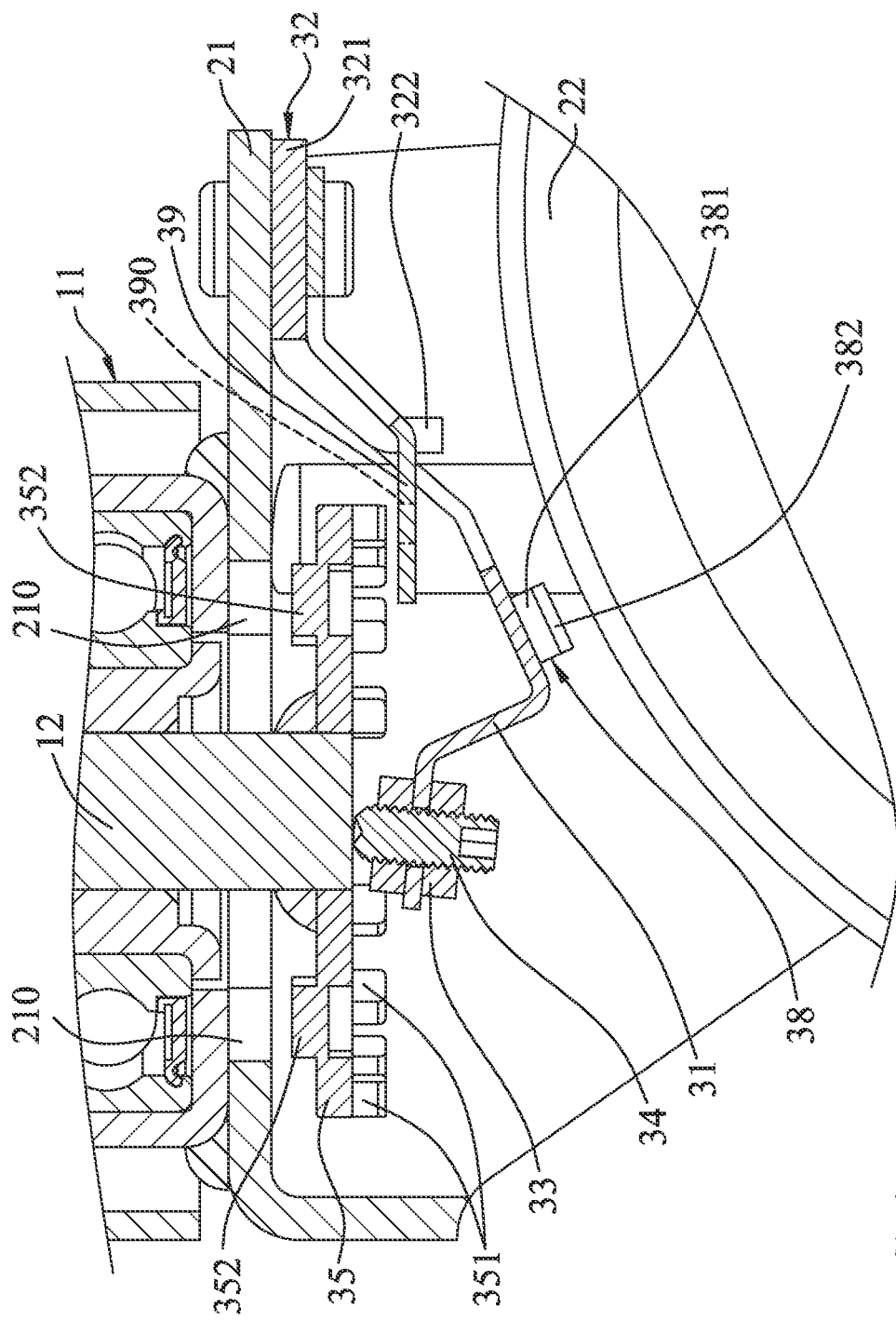
FIG. 9 is a fragmentary sectional view of the first embodiment shown in FIG. 6, illustrating a screw extending vertically and movably through a brake element such that a distance between the brake element and the wheel can be adjusted.

Further referring to FIG. 9, the screw 34 is configured such that only a single tool (not shown) is needed to be accessed to a lower end of the screw 34 so as to adjust a distance between the brake unit 3 and the wheel 22. When it is required to adjust a distance between the brake element 31 and the outer peripheral surface of the wheel 22, a hex wrench (not shown) is operated to access the lower end of the screw 34 to adjust a length of the screw 34 that protrudes outwardly of the internally threaded member 33, and is thus more convenient than the conventional wheel assembly described in the background section.

Figure 10:
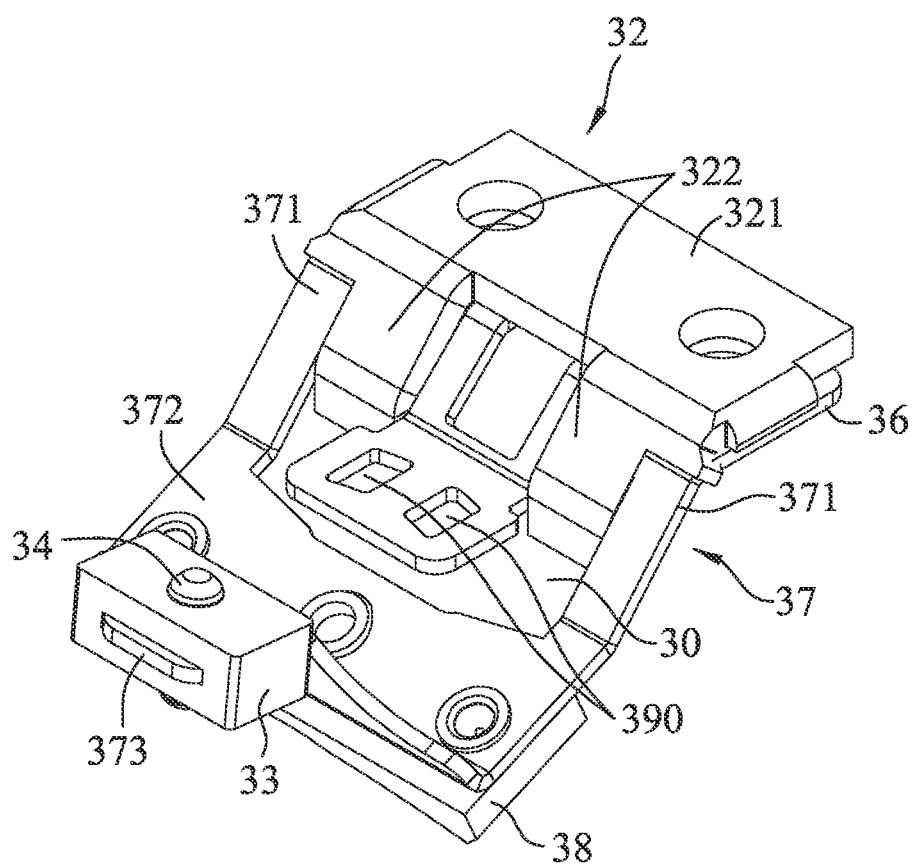
FIG. 10 is a perspective view of a portion of a brake unit of the wheel assembly of a second embodiment according to the present disclosure.

Referring to FIG. 10, a second embodiment of the wheel assembly according to the present disclosure is similar to the first embodiment, and the difference between the first and second embodiments resides in the structure of the brake unit 3. In this embodiment, the brake unit 3 has only one protrusion 38 that is a braking block extending from and disposed below the main body 37 and that is co-movable downwardly with the main body 37 to press against the outer peripheral surface of the wheel 22 to arrest rotation of the wheel 22. The protrusion 38 is, for example, but not limited to, riveted to lower end of the stamped segment 372. Note that in the second embodiment, the braking block is made of a material, e.g., nylon, different from the protruding tabs of the first embodiment, but the present disclosure is not limited to this example. A coefficient of friction between the braking block of the second embodiment and the outer peripheral surface of the wheel 22 is greater than that between the protruding tabs of the first embodiment and the outer peripheral surface of the wheel 22. In this way, the brake element 31 of the second embodiment provides a better braking capability than that provided by the first embodiment and thus the wheel 22 having a larger diameter or capable of carrying heavier object than the first embodiment can be used.

To sum up, by virtue of the arrangement of the brake element 31, the internally threaded member 33 and the limiting member 32, the number of components of the wheel assembly of the present disclosure is decreased as compared to the conventional wheel assembly. Further, the brake unit 3 has a relatively high structural strength and is thus relatively durable. Finally, it is relative simple to operate and assemble the wheel assembly of the present disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A wheel assembly, comprising:
   a transmission unit including a shaft seat and a transmission shaft extending through said shaft seat along an up-down direction, and operable to move relative to said shaft seat along the up-down direction;
   a wheel set unit including a wheel bracket mounted at a bottom end of said shaft seat and rotatable about said transmission shaft, and a wheel mounted pivotally to said wheel bracket; and
   a brake unit including a brake element that has a fixed end mounted fixedly to said wheel bracket, an internally threaded member that is spaced apart from said fixed end and that is sleeved movably on said brake element, and a screw that extends threadably through said internally threaded member and that extends vertically and movably through said brake element such that movement of said internally threaded member relative to said brake element is prevented, and that is pushable downwardly by said transmission shaft such that said brake unit moves downwardly to press resiliently against said wheel, so as to arrest rotation of said wheel;
   wherein said screw is configured such that a single tool is allowed to access a lower end of said screw so as to adjust a distance between said brake unit and said wheel.

2. The wheel assembly as claimed in claim 1, wherein said brake element further has a main body extending from and disposed below said fixed end, and at least one protrusion extending from and disposed below said main body, and co-movable downwardly with said main body to press against an outer peripheral surface of said wheel to arrest rotation of said wheel.

3. The wheel assembly as claimed in claim 2, wherein said brake unit further includes a toothed disc mounted to said transmission shaft, disposed under said shaft seat, and including a plurality of downwardly extending teeth angularly spaced apart from one another and arranged around said transmission shaft, said brake element further including a locking portion connected to said fixed end and formed with at least one hole, said toothed disc being co-movable downwardly with said transmission shaft to contact said locking portion, such that one of said teeth engages said hole to arrest pivot movement of said wheel about a central axis of said transmission shaft.

4. The wheel assembly as claimed in claim 3, wherein said main body includes two interconnecting segments extending downwardly and outwardly from said fixed end and flanking said locking portion, a stamped segment extending outwardly and downwardly from lower ends of said interconnecting segments and formed with said protrusion, and an insert segment extending outwardly and downwardly from said stamped segment, permitting said internally threaded member to be sleeved thereon, and permitting said screw to extend therethrough, said fixed end, said interconnecting segments and said stamped segment cooperating with one another to define an opening thereamong, said locking portion extending from said fixed end into said opening and disposed between and spaced apart from said interconnecting segments.

5. The wheel assembly as claimed in claim 4, wherein said brake element has two of said protrusions, each of said protrusions configured as a pressed protruding tab and including an extending segment extending downwardly from said stamped segment, and a brake segment extending transversely from said extending segment and being co-movable with said main body to press against said outer peripheral surface of said wheel.

6. The wheel assembly as claimed in claim 5, wherein said brake segment of each of said protrusions extends along a direction parallel to a rotating axis of said wheel.

7. The wheel assembly as claimed in claim 4, wherein said brake unit further includes a limiting member mounted to said wheel bracket, and including a mounting portion that is mounted between said fixed end and said wheel bracket, and two leg portions that are spaced apart from each other, that extend from and disposed below said mounting portion, that extends into said opening, and that abut respectively against two sides of said locking portion which are opposite along a direction parallel to a rotating axis of said wheel.

8. The wheel assembly as claimed in claim 4, wherein said transmission unit further includes a cam element rotatable about a transverse axis transverse to said transmission shaft and having an outer peripheral surface that abuts against a top end of said transmission shaft, and that has a protruding surface section, a first concaved surface section concaved radially and inwardly, and a second concaved surface section concaved radially and inwardly and having a depth smaller than that of said first concaved surface section in a radial direction, said cam element being operable to rotate about the transverse axis to allow a selected one of said first concaved surface section, said second concaved surface section and said protruding surface section to contact said transmission shaft such that: when said first concaved surface section contacts said transmission shaft, pivotal movement of said wheel about the central axis of said transmission shaft is prevented, while rotation of said wheel about a rotating axis of said wheel is allowed; when said second concaved surface section contacts said transmission shaft, rotation of said wheel about either of the central axis of said transmission shaft and the rotating axis of said wheel is allowed; and when said protruding surface section contacts said transmission shaft, rotation of said wheel about either of the central axis of said transmission shaft and the rotating axis of said wheel is prevented.

9. The wheel assembly as claimed in claim 8, wherein said wheel bracket has an inner periphery that is formed with two positioning notches, said toothed disc having an upper surface formed with two positioning protrusions, said transmission unit further including a biasing member mounted between said transmission shaft and said shaft bracket, and biasing said transmission shaft upwardly along the up-down direction to contact said cam element such that, when said first concaved surface section contacts said transmission shaft, said positioning protrusions are biased by said biasing member into said positioning notches, respectively, so as to prevent pivotal movement of said wheel about the central axis of said transmission shaft.

10. The wheel assembly as claimed in claim 9, wherein said internally threaded member is made of plastic.

11. The wheel assembly as claimed in claim 9, wherein when said protruding surface section comes into contact with said transmission shaft, said transmission shaft is pushed by said cam element to move said toothed disc downwardly so that said one of said teeth engages said hole to arrest pivotal movement of said wheel relative to the central axis of said transmission shaft, and that said brake segment of each of said protrusions is co-movable with said main body to press resiliently against said outer peripheral surface of said wheel.

\* \* \* \* \*